United States Patent [19]
Stroezel

[11] 3,844,392
[45] Oct. 29, 1974

[54] ONE-WAY CLUTCH ARRANGEMENT

[75] Inventor: Reinhold Stroezel, Im Waeldle, Germany

[73] Assignee: Robert Bosch GmbH, Stuttgart, Germany

[22] Filed: Nov. 1, 1972

[21] Appl. No.: 302,750

[30] Foreign Application Priority Data
Nov. 2, 1971  Germany............................ 2154335

[52] U.S. Cl. ................................................. 192/45
[51] Int. Cl. ............................................ F16d 15/00
[58] Field of Search ....................................... 192/45

[56] References Cited
UNITED STATES PATENTS
| | | | |
|---|---|---|---|
| 503,984 | 8/1893 | Palmer et al........................... | 192/45 |
| 1,496,577 | 6/1924 | Klausmeyer ........................... | 192/45 |

*Primary Examiner*—Samuel Scott
*Assistant Examiner*—Wesley S. Ratliff, Jr.
*Attorney, Agent, or Firm*—Michael S. Striker

[57] ABSTRACT

A one-way free wheeling clutch arrangement has an outer annular clutch part with a circular inner surface in sliding contact with the outer surface of a shaft which has a radial bore in which a spring and a spherical ball are located. The inner surface of the outer clutch part has a circumferential wedge-shaped recess with a steep spherical portion matching the ball, and a guide portion having a sloping face so that during rotation of the shaft in one direction of rotation, the ball engages the steep face whereby the clutch part is coupled to the shaft for rotation in one direction, and so that during rotation of the shaft in the opposite direction, the ball is pressed by the sloping face into the radial bore against the action of the spring so that the shaft can freely rotate relative to the outer clutch part.

3 Claims, 2 Drawing Figures

ONE-WAY CLUTCH ARRANGEMENT

BACKGROUND OF THE INVENTION

The present invention relates to a free-wheeling one-way clutch of the type in which at least one ball is jammed in relative rotation in one direction of a circular, and of a non-circular coupling part. Known one-way clutches of this type permit the two clutch parts to assume any relative angular position when coupled. This property of known one-way clutches is in many cases desirable, or irrevelant, but under certain operational conditions, this feature is undesirable, and a one-way clutch is required which couples the two clutch parts always in exactly the same relative angular position.

SUMMARY OF THE INVENTION

It is one object of the invention to provide a one-way clutch which always engages in the same angular position of two clutch parts when one of the clutch parts is rotated relative to the other clutch part.

Another object of the invention is to use one clutch part as a bearing, and the other clutch part as a shaft.

With these objects in view, the present invention provides a spherical coupling ball which is guided in a cavity or bore of one coupling part in substantial radial direction, cooperating with a recess in the other coupling part. Preferably one coupling part is an annular body, and the other coupling part a shaft mounted for rotation in the annular body.

In the preferred embodiment, the ball is biassed in radial direction toward the surrounding annular body by a spring located in the cavity.

One embodiment of the invention comprises an inner clutch part and an outer annular clutch part surrounding the inner clutch part, the inner clutch part having an outer annular surface and the outer clutch part having an inner annular surface in sliding contact with the outer annular surface so that at least one of the clutch parts is rotatable about an axis relative to the other clutch part, one of the clutch parts having in the surface thereof a circumferential recess including a steep face portion, and a sloping face portion forming a tapered space between the inner and outer surfaces, and the other clutch part having a cavity, such as a straight radial bore; and at least one coupling element, preferably a coupling ball located in the cavity biassed into the recess. During rotation of one of the clutch parts in one direction of rotation, the coupling ball engages the steep face portion whereby the clutch parts are coupled for rotation in one direction. During rotation of any one of the clutch parts in the opposite direction, the coupling ball is pressed by the sloping face portion of the recess into the cavity so that the clutch parts freely rotate relative to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
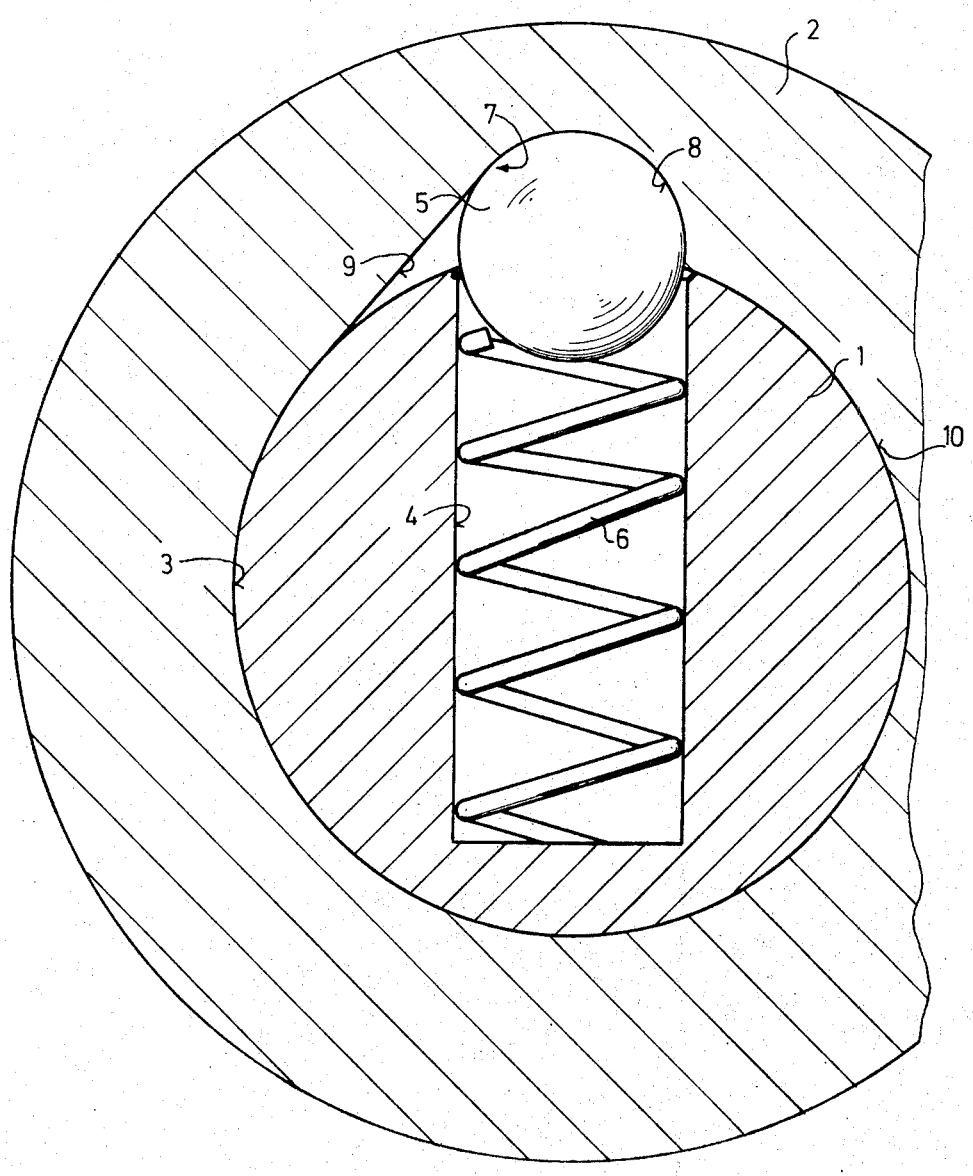
FIG. 1 is a cross-sectional view illustrating an embodiment of the invention.
Figure 2:
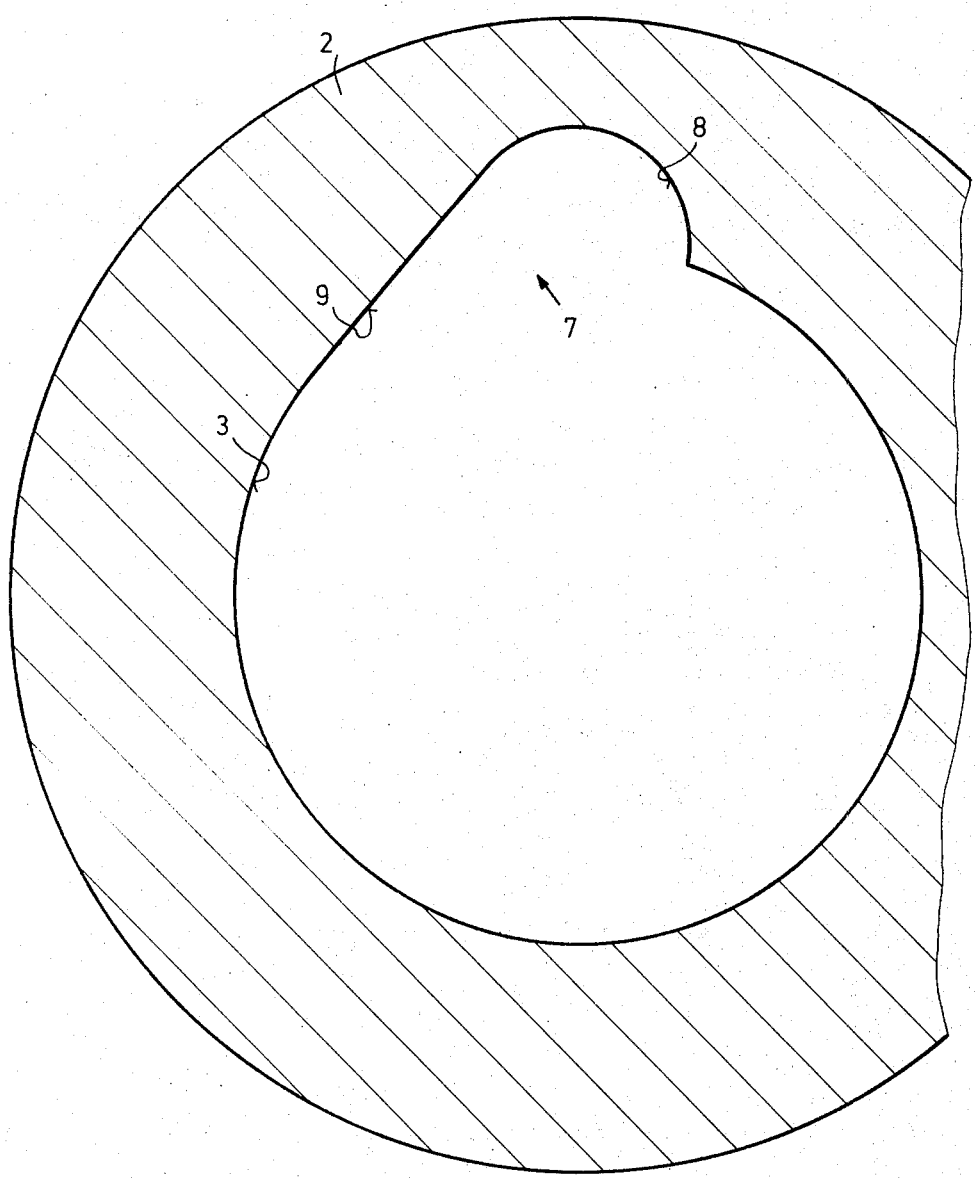
FIG. 2 is a cross-sectional view illustrating the outer annular clutch part.

A shaft 1, which may be driven in opposite directions of rotation, has an outer cylindrical surface 10 which slidingly engages the inner cylindrical surface 3 of an outer annular coupling part 2.

A spherical steel ball 5 is located in a radial bore 4 of the shaft 1 and is biassed by a spring 6 in outward direction. The spring 6 abuts the bottom of the cavity or bore 4 at one end, and the ball 5 at the other end. The diameters of spring 6 and of ball 5 are substantially equal to the diameter of the bore 4 so that spring 6 and ball 5 are guided in bore 4.

In the circular or cylindrical inner surface 3 of the outer clutch part 2, a recess 7 is formed which includes a spherical surface portion 8, and a guide portion 9 tangential to the spherical surface portion 8, and merging into the inner surface 3 so that the recess 7 is a wedge-shaped pocket and forms with the outer surface 10 of shaft 1, a tapered space. The surface portion 9 slopes at a small angle relative to the outer surface 10 of shaft 1, while the spherical surface portion 8 provides a steep face relative to the outer surface 3 of shaft 1.

When shaft 1 is rotated in counterclockwise direction, the spherical ball 5 is moved along the sloping face portion 9, and is passed by the same into the radial bore 4 until the ball 5 arrives at the circular inner surface 3 and slides along the same. If the shaft is rotated beyond 360°, ball 5 snaps again into the spherical surface portion 8 of recess 7, and is then again pressed by the sloping face portion 9 into the radial bore 4 so that the rotation in counterclockwise direction can be continued.

If shaft 1 is rotated in clockwise direction, in the position of FIG. 1, the step face of the spherical recess portion 8 does not permit pressing of ball 7 into the bore, so that the outer clutch part 2 is coupled by the coupling ball 5 with shaft 1, and rotates with the same in clockwise direction.

If the shaft 1 is in a position in which the ball 5 abuts the inner surface 3 of the outer clutch part circumferentially spaced from the recess 7, rotation of shaft 1 will first cause sliding or rolling of ball 5 on the inner surface 3 of the outer clutch part 2 until the ball 5 arrives at the sloping face 9 of recess 7, and moves along the same while moving also outward due to the action of spring 6, until ball 5 fully abuts the spherical surface portion 8 of recess 7 in the illustrated position in which the shaft 1 is coupled with the outer coupling part 2.

Since the ball 5 is clamped between the circular edge formed by bore 4 in the outer surface 10 of shaft 1, and the steep spherical face portion 8 of recess 7, it is subjected to shearing stress so that a high torque can be transmitted from shaft 1 to coupling part 2.

It will be seen that, irrespectively of the relative angular position between shaft 1 and the outer annular clutch part 2, the clutch will engage always in the same relative angular position of the clutch part 2 and shaft 1, which is not possible with conventional one-way clutches. Due to the fact that the ball 5 is subjected to shearing stresses, a greater force can be transmitted than in conventional one-way clutches in which the balls are jammed while transmitting torque.

It is a particular advantage of the invention that under certain conditions, a bearing for shaft 1 can be omitted, and the annular clutch part 2 can be used as bearing for shaft 1 rotating in counterclockwise direction.

It will be understood that each of the elements described above, or two or more together, may also find a useful application in other types of one-way clutches differing from the types described above.

While the invention has been illustrated and described as embodied in a one-way clutch including a shaft coupled by a radially movable ball with a surrounding clutch part, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A one-way free wheeling clutch arrangement comprising an inner clutch part and an outer clutch part surrounding said inner clutch part, said inner clutch part having an outer cylindrical surface and said outer clutch part having an inner cylindrical surface in sliding contact with said outer cylindrical surface so that said clutch parts are rotatable relative to each other about an axis, said inner clutch part being provided with a single radial bore extending from said outer cylindrical surface thereof thereinto and having a closed end, and said outer clutch part having a wedge-shaped recess extending from said inner cylindrical surface thereinto, said recess including a steep face portion and a sloping face portion tangential to said inner cylindrical surface and forming a tapered space between said inner and outer surfaces; a spherical coupling element located at least in part in said radial bore; and spring means in said bore and abutting with one end thereof said spherical coupling element and with the other end said closed end of said bore for biasing said coupling element in radial direction into said recess so that during rotation of at least one of said clutch parts in one direction of rotation, said coupling element engages said steep face portion whereby said clutch parts are coupled for rotation in said one direction, and so that during rotation of any one of said clutch parts in the opposite direction, said coupling element is pressed by said sloping face portion into said bore so that said clutch parts can freely rotate relative to each other.

2. A clutch arrangement as claimed in claim 1, wherein said steep face portion comprises a part spherical surface portion matching said spherical coupling element and wherein said sloping face portion is also tangential to said part spherical surface portion.

3. Clutch arrangement as claimed in claim 1 wherein said inner clutch part is a shaft, and wherein said inner surface of said outer clutch part slidingly engages the outer surface of said shaft.

* * * * *